United States Patent [19]

Dwyer et al.

[11] Patent Number: 4,526,879

[45] Date of Patent: Jul. 2, 1985

[54] SYNTHESIS OF ZEOLITE ZSM-5

[75] Inventors: Francis G. Dwyer, West Chester, Pa.; Pochen Chu, West Deptford, N.J.

[73] Assignee: Mobil Oil Corporation, New York, N.Y.

[21] Appl. No.: 520,746

[22] Filed: Aug. 5, 1983

Related U.S. Application Data

[63] Continuation of Ser. No. 295,967, Aug. 25, 1981, abandoned, which is a continuation of Ser. No. 960,158, Nov. 13, 1978, abandoned.

[51] Int. Cl.$^3$ .............................................. C01B 33/28
[52] U.S. Cl. ...................................... 502/71; 423/329
[58] Field of Search ............................... 423/326–330; 260/448 C; 502/60, 71, 77

[56] References Cited

U.S. PATENT DOCUMENTS

| | | | |
|---|---|---|---|
| 4,025,571 | 5/1977 | Lago | 423/328 X |
| 4,025,572 | 5/1977 | Lago | 423/328 X |
| 4,082,805 | 4/1978 | Kaeding | 423/328 X |
| 4,139,600 | 2/1979 | Bollmann et al. | 423/329 |
| 4,151,189 | 4/1979 | Rubin et al. | 423/329 X |

FOREIGN PATENT DOCUMENTS 1365318  8/1974  United Kingdom ................ 423/329

*Primary Examiner*—Edward J. Meros
*Attorney, Agent, or Firm*—A. J. McKillop; M. G. Gilman; L. P. Hobbes

[57] ABSTRACT

As synthesized by conventional technique, zeolite ZSM-5 is crystallized in the presence of substantial amount of tetraalkylammonium cations, the alkyl groups of which contain 2 to 5 carbon atoms, such as, for example, tetrapropylammonium. When synthesized in the conventional way, ZSM-5 contains tetraalkylammonium cations as well as a substantial amount of sodium ions. To obtain a more catalytically active form of ZSM-5, the sodium ions must be exchanged to very low levels. By synthesizing zeolite ZSM-5 according to the present method, i.e., in the presence of a combination of an amine and a halide in the presence of a mutual solvent and with a specifically defined reaction mixture composition, ZSM-5 having different organic nitrogen-containing cations but the same crystal structure as conventionally prepared ZSM-5 is obtained. The ZSM-5 prepared in accordance herewith is very low in sodium content as synthesized and has a crystal size of from about 0.05 microns to about 20 microns.

8 Claims, No Drawings

SYNTHESIS OF ZEOLITE ZSM-5

This is a continuation of copending application Ser. No. 295,967, filed Aug. 25, 1981, which is a continuation of application Ser. No. 960,158, filed Nov. 13, 1978 both abandoned.

BACKGROUND OF THE INVENTION

Field of the Invention

The present invention relates to a process for preparing ZSM-5. More particularly, it relates to making and using ZSM-5 which, in its as-synthesized form, has different organic nitrogen-containing cations, low sodium content and the same crystal structure as conventionally synthesized ZSM-5.

Summary of the Prior Art

Zeolite ZSM-5 is a zeolite which in its conveniently synthesized aluminosilicate form has the following composition expressed in terms of mole ratios of oxides in the anhydrous state:

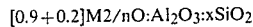

$$[0.9 \pm 0.2]M_{2/n}O:Al_2O_3:xSiO_2$$

wherein M is selected from the group consisting of a mixture of tetraalkylammonium cations, the alkyl groups of which contain 2–5 carbon atoms, and alkali metal cations, especially sodium and x is at least 5, said cations having the valence n. ZSM-5 has a distinctive X-ray diffraction pattern which further identifies it from other known zeolites. The original alkali metal cations of ZSM-5 can be exchanged by ion exchange with other ions to form species of the zeolite which have exceptional catalytic properties. Zeolite ZSM-5 and its conventional preparation are the subject of U.S. Pat. No. 3,702,886, the disclosure of which is incorporated herein by reference.

SUMMARY OF THE INVENTION

In accordance with the invention, there is provided a method for preparing ZSM-5 which comprises preparing a mixture containing sources of an alkali metal oxide, an aluminum oxide, a silicon oxide and a combination of amine, a halide and a mutual solvent, said mixture having a composition, in mole ratios of oxides, within the following ranges:

| | |
|---|---|
| $SiO_2/Al_2O_3$ | 5–1000 |
| $H_2O/SiO_2$ | 5–200 |
| $M/SiO_2$ | 0.01–3.0 |
| $R/SiO_2$ | 0.01–2.0 | wherein R represents the radical or mixture of radicals obtained from the association of the $C_1$–$C_6$ alkyl amine and the $C_1$–$C_6$ alkyl halide and M is an alkali metal or an alkaline earth cations.

DESCRIPTION OF SPECIFIC EMBODIMENTS

Zeolite ZSM-5 has been conventionally prepared by forming a mixture of alumina, silica, alkali metal oxide, water and tetraalkylammonium compounds such that the mixture has a composition, in terms of mole ratios of oxides, falling within the following range:

| | |
|---|---|
| $SiO_2/Al_2O_3$ | 5–100 |
| $H_2O/SiO_2$ | 0.7–3000 |
| $M/SiO_2$ | 0.3–3.0 |
| $R/SiO_2$ | 0.01–2.0 | wherein M is an alkali metal ion and R is a tetraalkylammonium cation, the alkyl groups of which contains 2–5 carbon atoms. The reaction mixture is maintained at a temperature of from about 100° F. to about 400° F. until crystals of ZSM-5 are formed.

Zeolite ZSM-5 possesses a definite distinguishing crystalline structure whose X-ray diffraction pattern shows the following significant lines:

TABLE I

| Interplanar Spacing | Relative Intensity |
|---|---|
| 11.1 ± 0.3 | S |
| 10.0 ± 0.3 | S |
| 7.4 ± 0.2 | W |
| 7.1 ± 0.2 | W |
| 6.3 ± 0.2 | W |
| 6.04 ± 0.2 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | W |
| 2.99 ± 0.02 | W |
| 2.94 ± 0.02 | W |

These values were determined by standard technique. The radiation was the K-alpha doublet of copper, and a scintillation counter spectrometer with a strip chart open recorder was used. The peak heights, I, and the positions as a function of 2 times theta, where theta is the Bragg angle, were read from the spectrometer chart. From these, the relative intensities, $100I/I_o$ is the intensity of the strongest line or peak, and d (obs.), the interplanar spacing in A, corresponding to the recorded lines, were calculated. In Table I the relative intensities are given in terms of the symbols W=weak, S=strong and WS=very strong. It should be understood that this X-ray diffraction pattern is characteristic of all the species of ZSM-5 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

In the present method of preparing a ZSM-5 crystalline aluminosilicate zeolite, a reaction mixture is prepared comprising sources of alkali metal, alumina, silica, organic nitrogen-containing cations and water. The reaction mixture has the following composition, expressed in terms of mole ratios of oxides:

| | Broad | Preferred | Most Preferred |
|---|---|---|---|
| $SiO_2/Al_2O_3$ | 5–1000 | 10–500 | 20–200 |
| $H_2O/SiO_2$ | 5–200 | 10–100 | 15–60 |
| $M/SiO_2$ | 0.01–3.0 | 0.1–2.0 | 0.2–2.0 |
| $R/SiO_2$ | 0.01–2.0 | 0.05–1.0 | 0.1–1.0 | wherein M is an alkali metal or alkaline earth cation, preferably sodium, and R is as defined hereinabove. As is apparent, the amine may be a $C_1$–$C_6$ alkylamine and the halide a $C_1$–$C_6$ alkyl halide. The amine and halide can be added to the reaction mixture per se or in its precombined form. In combining these the alkyl groups associated with the amine and halide may be the same or they may be different. For example, both alkyls may be propyl or one may be propyl and the other methyl. The solvent may be any that dissolves both the reactants and the product. Practically, however, it should be easily retained in the mixture at the temperatures of crytallization and should not be so high boiling that it is difficult to remove. An example of an effective solvent is methylethyl ketone. The reaction mixture is maintained at a temperature of from about 100° F. to about 400° F. for a period of time of from about 3 hours to about 180 days until crystals of ZSM-5 are formed. A more preferred temperature range is from about 180° F. to about 350° F. for a period of time at a temperature within such preferred range being from about 3 hours to about 30 days.

The digestion of the gel particles is carried out until no further crystals form. The solid product is separated from the reaction medium, as by cooling the whole to room temperature, filtering and water washing.

In addition to providing a low-sodium ZSM-5 (i.e. from about 0.01 or less to about 0.20%) which can be used as a catalyst without intermediate exchange, it is interesting to note that the present method of preparation of ZSM-5 also provides the benefit of being lower cost than conventional preparation technique since the template materials for use herein are substantially lower cost than the conventional template materials.

The method provides another advantage not apparent from the prior art.

ZSM-5 prepared using conventional tetraalkylammonium cations has a small crystal structure, i.e., a crystal size of the order of about 0.02 micron to about 20 microns. It is known from our own prior work that, in attempting to find other, less expensive templates, the use of other nitrogen-containing materials, such as primary amines, resulted in ZSM-5 having large crystals. Since it is desirable for many purposes to have small crystal ZSM-5, it was apparent that a modification to the crystallization medium would have to be made to retain the low sodium feature and to preserve the desired small crystals, i.e., from about 0.05 micron to about 20 microns. This is attained using the mixture of amine and halide in a ratio of amine to halide of from about 2:1 to about 10:1.

The composition for the synthesis of synthetic ZSM-5 can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing ZSM-5 can be supplied by one or more essential reactants and they can be mixed together in any order. For example, any oxide can be supplied by an aqueous solution, sodium hydroxide or by an aqueous solution of a suitable silicate; the organic nitrogen-containing cation can be supplied by a compound of that cation, such as, for example, a salt, as well as by the indicated diamine. The reaction mixture can be prepared either batch wise or continuously. Crystal size and crystallization time of the ZSM-5 composition will vary with the nature of the reaction mixture employed.

The ZSM-5 composition as prepared hereby has the characteristic X-ray diffraction pattern of conventionally prepared ZSM-5, the values of which are set forth in Table I.

Even though the presently prepared ZSM-5 has a low amount of alkali metal, e.g., sodium ions, as synthesized, and therefore may be utilized as catalytic material for a number of hydrocarbon conversion reactions substantially as synthesized, the original cations of the as synthesized ZSM-5 can be replaced in accordance with techniques well known in the art, as least in part, by ion exchange with other cations. Preferred replacing cations include metal ions, ammonium ions, hydrogen ions and mixtures thereof. Particularly preferred cations are those which render the zeolite catalytically active especially for hydrocarbon conversion. These include hydrogen, rare earth metals, aluminum, metals of Groups IIA, IIIB, IVB, VIB, VIII, IB, IIB, IIIA, IVA. Of the replacing metallic cations, particular preference is given to cations of metals such as rare earth, Mn, Ca, Mg, Zn, Cd, Pd, Ni, Co, Ti, Al, Sn, Fe and Co.

A typical ion exchange technique involves contacting the synthetic ZSM-5 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 150° F. to about 600° F. and thereafter may be calcined in air or other inert gas at temperatures ranging from about 500° F. to 1500° F. for periods of time ranging from 1 to 48 hours or more to produce a catalytically-active thermal decomposition product thereof.

Regardless of the cation replacing the cations in the synthesized form of the ZSM-5, the spatial arrangement of the aluminum, silicon and oxygen atoms which form the basic crystal lattices of ZSM-5 remains essentially unchanged by the described replacement of the original cations as determined by taking an X-ray powder diffraction pattern of the ion-exchanged material.

ZSM-5 prepared by the present method may be used in a wide variety of organic compound conversion processes, e.g. hydrocarbon compounds and oxygenates such as methanol. Such processes include, for example, alkylation of aromatics with olefins, aromatization of normally gaseous olefins and paraffins, aromatization of normally liquid low molecular weight paraffins and olefins, isomerization of aromatics, paraffins and olefins, disproportionation of aromatics, transalkylation of aromatics, oligomerization of olefins and cracking and hydrocracking. All of the foregoing catalytic processes are of value since they result in upgrading of the organic charge being processed.

Synthetic ZSM-5 zeolites prepared in accordance herewith can be used either in the organic nitrogen-containing form, the alkali metal form, the hydrogen form or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-5 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

The aluminosilicate catalyst prepared by the instant invention can be formed into a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially and then extruded.

As in the case of many other catalysts, it is desired to incorporate the ZSM-5 hereby prepared with another material resistant to the temperatures and other conditions employed in organic conversion processes. Such matrix materials include active and inactive materials and synthetic or naturally occurring zeolites as well as organic materials such as clays, silica and/or metal oxides. The latter may be either naturally occurring or in the form of gelatinous precipitates, sols or gels including mixtures of silica and metal oxides. Use of a material in conjunction with the ZSM-5, i.e., combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized ZSM-5 catalyst include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state or initially subjected to calcination, acid treatment or chemical modification.

In addition to the foregoing materials, the ZSM-5 catalyst hereby synthesized can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-5 and inorganic oxide gel matrix vary widely with the crystalline aluminosilicate content ranging from about 1 to about 90 percent by weight and more usually in the range of about 2 to about 50 percent by weight of the composite.

In employing the ZSM-5 catalyst of this invention for polymerization of olefin containing liquid or gaseous charge stocks, such charge stocks can be polymerized at temperatures between 550° and 850° F. at an hourly space velocity of between 0.5 and 50 WHSV and a pressure between 0.1 and 800 psig.

In employing the catalyst of the present invention for aromatization of gaseous or liquid charge stocks which may be olefinic or paraffinic with or without aromatics present, such stocks can be aromatized at temperatures between 800° and 1200° F. and pressures from 1 to 10 atmospheres and space velocities between 0.1 and 10 WHSV.

In order to more fully illustrate the nature of the invention and the manner of practicing same, the following examples are presented.

EXAMPLES 1-5

In all crystallizations, the silicate and acid alum solutions were charged simultaneously through a nozzle into an autoclave equipped with high shear agitation and excellent temperature control. The resulting gels were well-mixed before any organics were added. Crystallization temperatures were 200°–220° F. for first stage crystallization. When a crystallinity of at least 65% was reached, the temperature was raised to 320° F. for the remainder of the crystallization. The temperature sequence was designed to permit extensive nucleation with low crystal growth rate at the low temperature followed by rapid completion of crystal growth at high temperature.

Table 1 summarizes the data obtained.

TABLE II

| Example | 1 | 2 | 3 | 4 | 5 |
|---|---|---|---|---|---|
| Molar Composition of Charge | | | | | |
| $Al_2O_3$ | 1.0 | 1.0 | 1.0 | 1.0 | 1.0 |
| $SiO_2$ | 81.3 | 81.3 | 81.3 | 81.2 | 81.2 |
| Na | 104.1 | 104.1 | 104.1 | 104.1 | 104.1 |
| n-propyl amine | 24.3 | 24.3 | 24.3 | 32.3 | 32.3 |
| n-propyl bromide | 4.03 | 4.03 | 4.03 | 5.36 | — |
| MEK | 13.3 | 13.3 | 13.3 | 13.3 | — |
| $H_2O$ | 1736 | 1736 | 1736 | 1736 | 1736 |
| Crystallization | | | | | |
| Pre-reaction | | | | | |
| Temp. °F. | 220 | 220 | 220 | 220 | — |
| Time, Hrs. | 6.0 | 6.0 | 6.0 | 6.0 | — |
| Agitation, rpm | 0 | 0 | 0 | 0 | — |
| First Stage Crystallization | | | | | |
| Temp. °F. | 220 | 222 | 217 | 220 | 220 |
| Time, Hrs. | 162 | 88.5 | 132 | 137 | 124 |
| Agitation, rpm | 250 | 250 | 90 | 90 | 90 |
| Second Stage Crystallization | | | | | |
| Temp. °F. | — | — | 320 | 320 | 320 |
| Time, Hrs. | — | — | 4.5 | 1.0 | 1.0 |
| Agitation, rpm | — | — | 90 | 90 | 90 |
| Product Data | | | | | |
| Crystallinity, % | 95 | 95 | 100 | 85 | 90 |
| Crystal Size, $SiO_{0.05}$ | 0.03 0.15 | 0.03 | | | |
| Mole Ratio of Product (dialyzed) | | | | | |
| $DiO_2/Al_2O_3$ | 76.7 | 68.9 | 67.8 | 67.6 | 76.2 |
| $Na/Al_2O_3$ | 0.47 | 0.18 | 0.04 | 0.04 | 0.04 |
| (washed) (Na, % Wt.) | 0.22 | 0.12 | 0.02 | 0.02 | 0.02 |

TABLE II-continued

| Example | 1 | 2 | 3 | 4 | 5 |
|---|---|---|---|---|---|
| N/Al$_2$O$_3$ | 3.72 | 3.72 | 4.72 | 2.37 | 6.89 |
| C/Al$_2$O$_3$ | 18.25 | 20.09 | 22.11 | 19.91 | 23.83 |
| Adsorption | | | | | |
| H$_2$O, % Wt. | 5.1 | 5.7 | 6.5 | 9.2 | 9.3 |
| C$_y$C$_6$ | 6.0 | 4.6 | 5.8 | 6.3 | 9.3 |
| nC$_6$ | 9.9 | 10.0 | 9.1 | 10.3 | 8.9 |

EXAMPLE 6

The synthesis of low sodium, small crystal ZSM-5 using organic mixture of this invention is not limited to gel type preparations. This example exemplifies a preparation using an amorphous silica solid, instead of sodium silicate liquid, Q-brand. Gel was not formed during the preparation. An acid alum solution was prepared by mixing 119 parts of Al$_2$(SO$_4$)$_3$.14H$_2$O, 815 parts of NaCl and 5000 parts of H$_2$O. A caustic solution was prepared by mixing together 122 parts of NaOH, 825 parts of NaCl, 20 parts of Daxad 27 (sodium alkylbenzene sulfonate combined with an inert inorganic suspending agent) and 5000 parts of H$_2$O. These two solutions were charged into an autoclave at the same time. 2129 parts of Hi-Sil were then added and mixed into this solution. A pre-mixed organic solution of 575 parts of n-propylamine, 199 parts of n-propyl bromide and 383 parts of methylethyl ketone was also added. The whole mixture was heated at 200° F. and agitated. The crystallinity of the product was 85% ZSM-5 after 209 hours. The product had a crystal size of <0.05 micron and had a low sodium level after water washing.

EXAMPLE 7

Gel Preparation

Silicate and acid alum solutions were prepared and nozzle-mixed using the standard quantities and procedures for production ZSM-5.

Silicate Solution 27.7 parts of Q-brand sodium silicate (28.7% SiO$_2$, 8.9% Na$_2$O)
16.0 parts of water
0.08 part of Daxad 27

Acid Alum Solution 1.0 part of aluminum sulphate
2.4 parts of sulphuric acid (93.2%)
1.2 parts of sodium chloride
16.4 parts of water

Salt Added After Nozzle Mixing 3.9 parts of sodium chloride
The gel was brought up to 200° F. with maximum agitation.

Organics Addition

Cold n-propyl bromide and methyl ethyl ketone were first added to the quiescent gel layer in the crystallizer followed by cold n-propyl amine. The quantities were
0.08 part of n-propyl bromide
0.09 part of methyl ethyl ketone
0.23 part of n-propyl amine
The temperature of the organics layer was raised by stirring first at 3 rpm and subsequently at 10–20 rpm, to increase the heating rate. After six hours, the agitator speed was raised to 90 rpm.

Crystallization Time

Samples were tested for crystallinity by X-ray diffraction as follows during the course of the crystallization.

| Temp. °F. | Crystallization Time, Hrs. | Crystallinity, |
|---|---|---|
| 200 | 95 | <40 |
| 205 | 112 | <40 |
| 208 | 120 | 50 |
| 210 | 128 | 75 |
| 210 | 136 | 80 |
| 315 | 145 | 100 |

Decant Washing

The ZSM-5 settled in little over one hour and decant washing time was subsequently short. A sodium content of 0.07% wt. in the zeolite was achieved after 5 decant washings. To facilitate lowering the sodium content to less than about 0.05 wt. %, 0.65 parts of ammonium nitrate were added to the decant vessel to accelerate the sodium removal from the zeolite. This operation reduced the sodium content to 0.02% wt.

The X-ray pattern of this ZSM-5 was determined to be essentially identical to that of Example 3. The crystallinity was 105% based on Example 3. The sodium content was 0.02% wt and the crystallite size about 0.05 micron.

What is claimed is:

1. A method for preparing ZSM-5 having a crystal size of from about 0.03 micron to about 20 microns and an alkali metal content ranging from about 0.01 to about 0.20 weight percent which method comprises preparing a mixture containing sources of an alkali metal oxide, an aluminum oxide, a silicon oxide and a combination of a C$_1$–C$_6$ primary alkylamine and a C$_1$–C$_6$ alkyl halide in a ratio of amine to halide of from about 2:1 to about 10:1, and a solvent, said mixture having a composition, in mole ratios of oxides, within the following ranges:

| SiO$_2$/Al$_2$O$_3$ | 10–500 |
|---|---|
| H$_2$O/SiO$_2$ | 10–100 |
| M/SiO$_2$ | 0.1–2.0 |
| R/SiO$_2$ | 0.05–1.0 | wherein R represents the radical or mixture of radicals obtained from the association of said C$_1$–C$_6$ alkyl amine and said C$_1$–C$_6$ alkyl halide and M is an alkali metal or an alkaline earth cation, and reacting said mixture at from about 100° F. to about 350° F. until ZSM-5 crystallization is complete.

2. The method of claim 1 wherein the alkyls of the amine and halide are different.

3. The method of claim 1 wherein the alkyls are propyl.

4. The method of claim 1 wherein said crystal size is from about 0.03 micron to about 0.15 micron.

5. The method of claim 1 wherein the solvent is methylethyl ketone.

6. The method of claim 1 wherein said ZSM-5 is combined with a hydrogenation component.

7. The method of claim 1 wherein said ZSM-5 is combined with a matrix material.

8. The method of claim 1 wherein the crystallization is carried out for from about 3 hours to about 180 days.

\* \* \* \* \*

UNITED STATES PATENT AND TRADEMARK OFFICE
CERTIFICATE OF CORRECTION

PATENT NO. : 4,526,879
DATED : July 2, 1985
INVENTOR(S) : F. G. Dwyer and P. Chu It is certified that error appears in the above-identified patent and that said Letters Patent is hereby corrected as shown below:

Column 2, line 41, change "WS" to --VS--.

Column 4, line 5, change "as" to --at--.

Column 6, line 61, delete "SiO$_{0.05}$ 0.15".

Column 6, line 62, delete "size',"

Column 6, line 65, change "DiO$_2$/Al$_2$O$_3$" to --SiO$_2$/Al$_2$O$_3$--.

Signed and Sealed this

Third Day of December 1985

[SEAL]

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,526,879
DATED : July 2, 1985
INVENTOR(S) : F. G. Dwyer and P. Chu It is certified that error appears in the above-identified patent and that said Letters Patent is hereby corrected as shown below:

Column 6, line 60, change "crystal 0.03 0.03" to --crystal size 0.03 0.03 0.05 0.05 0.15--

Signed and Sealed this

Eleventh Day of February 1986

[SEAL]

Attest:

DONALD J. QUIGG

Attesting Officer

Commissioner of Patents and Trademarks